UNITED STATES PATENT OFFICE.

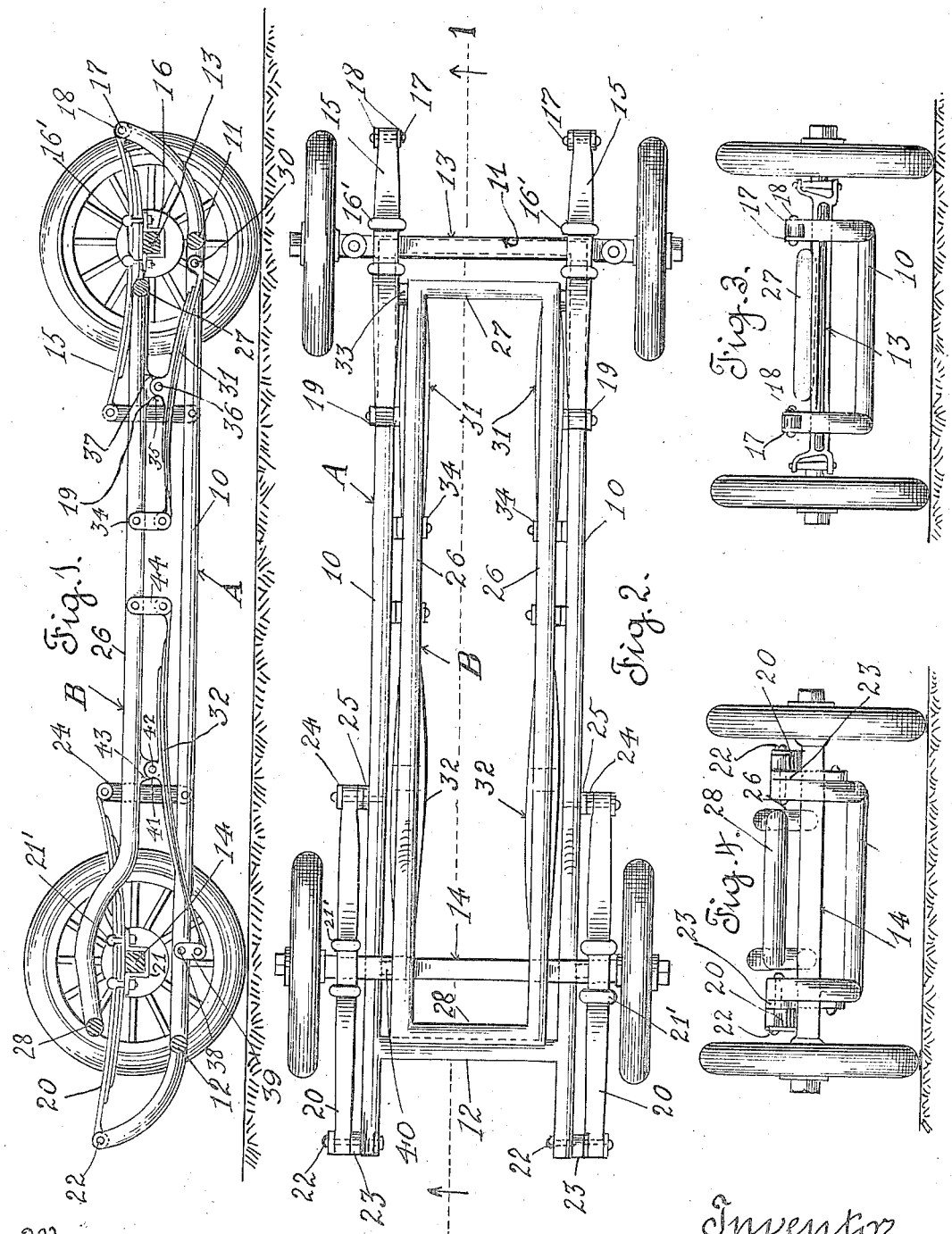

FRED GUENTHER, OF LOS ANGELES, CALIFORNIA.

SPRING-SUSPENDED FRAME FOR AUTOMOBILES.

1,228,319.    Specification of Letters Patent.    Patented May 29, 1917.

Application filed January 11, 1916. Serial No. 71,459.

*To all whom it may concern:*

Be it known that I, FRED GUENTHER, a citizen of the United States, residing at Los Angeles, in the county of Los Angeles and State of California, have invented new and useful Improvements in Spring-Suspended Frames for Automobiles, of which the following is a specification.

My invention relates to a frame for vehicles, and especially for automobiles, and is designed to act as a shock absorber.

It is an object of this invention to construct a frame for automobiles which is suspended from springs in such a way as to absorb and counter-act jars and cumulated vibrations incident on roughness in the road, or a high degree of speed.

With these and other objects in view which will appear as the description proceeds, my invention consists in the construction and arrangement of parts hereinafter described and claimed.

In the accompanying drawings, which form a part of this specification, I have illustrated a convenient and practical embodiment of my invention, and in which, Figure 1, is a longitudinal vertical cross section taken on line 1—1, Fig. 2, of my improved automobile frame showing its mounting on the front and rear axle.

Fig 2, is a top plan view thereof.

Figs. 3, and 4, are front and rear views, respectively, of the frame shown in Fig. 2.

A designates a lower rectangular frame, consisting of a pair of side members 10, 10, and a pair of cross members, 11 denoting the front cross-member, and 12 the rear cross-member. This frame A is disposed below the front and rear axles 13, 14. The ends of the side members of the frame extend below and outwardly in front and at the rear of axles 13, 14, and are curved slightly upwardly. The front cross-member is in vertical alinement with the front axle 13, while the rear cross member 12 is disposed at some distance in the rear of rear axle 14.

15, 15 designate a pair of semi-elliptical leaf springs having upwardly curving ends. These springs are mounted on the front axle 13, and extend parallel to and in a vertical plane above the side members 10, 10. The springs are secured to the front axle so that a small length of spring extends in front, and a greater length to the rear of the front axle 13. They are secured to the axle in any suitable manner, such as a spring cushion 16 and spring clips 16'.

The spring 15 is provided at its forward end with an eye, and a bolt 17 pivotally connects said spring to a pair of lateral ears 18, extending upwardly from the ends of the forward end of side member 10. The rear end of the spring 15 is pivotally connected to the side member 10 by means of a shackle 19.

The frame A is suspended from the rear axle 14 as follows:

A pair of semi-elliptical leaf springs 20, having upwardly curving ends is secured to the rear axle 14 by means of a spring cushion 21, and a clip 21'. Rear springs 20 are of greater length than front springs 15, and are secured to the rear axle 14 at their middle points. The rear springs 20 extend above, and in a plane adjacent and parallel to the outer faces of the side members 10. A horizontal pin 22 extending laterally from the rear end of the side member passes through the eye provided at the rear end of spring 20, and secures the latter in pivotal relation to said side member. A spacing washer 23 is mounted on pin 22 between said spring and said side member. A shackle 24 extending downwardly from the forward end of the spring 20 pivotally connects the latter with the lateral face of the side member 10. A spacing washer 25 is interposed on the shackle bolt between the side member and the shackle.

A rectangular upper frame B, having side members 26, and a front cross-member 27, and a rear cross-member 28, extends above and in parallel relation to frame A. Said frame is smaller than frame A and is disposed above and spaced from the periphery of the lower frame. The front cross-member 27 is spaced a slight distance from the front axle and vertically below the center of springs 15, while the rear cross-member 28 is vertically above the rear cross-member 12 of the lower frame A. 31 denotes a pair of front springs, and 32 a pair of rear springs which are semi-elliptical in shape with downwardly turning ends, and connect the upper frame to the lower frame.

A horizontal pin 30 extending laterally from the inside of the side member of the lower frame at a point adjacent to the front cross-member 11 pivotally engages the eye of the forward end of the spring 31. A spacing washer 33 is interposed between the side member 10 and the spring. The rear end of spring 31 is pivotally connected to side member 26 by means of a shackle 34. At the center of the spring a pair of perforated ears 35 are pivotally connected by a pin 36 to a perforated lug 37, the latter extending vertically downwardly from the side member 26.

The rear spring 32 is connected to the lower and upper frames as follows:

38 designates a pin, arranged vertically below the rear axle extending horizontally from the side member 10. A shackle 39 is suspended therefrom which engages the rear end of spring 32. 40 is a spacing washer, interposed between the shackle 39 and side member 10, 41 are the ears, 42 is the pin, 43 is the lug and 44 is the shackle connecting the forward end of spring 32 to side member 26. It should be noted that the rear portions of the side member 26 of the upper frame form an upper curve above the rear axle for the purpose of allowing greater vertical up and down movements of said frame when the vehicle is traveling.

From the foregoing description the operation of the improved vehicle frame will be easily understood. The spring mounted lower frame, which is one of the standard vehicle frames in common use, will act as a shock absorber. The upper frame, spring mounted to the lower frame, will absorb the shocks communicated to it from the lower frame, thereby reducing the same to a minimum, and effecting an easy riding motion of the body of the vehicle. It should be noted that the front springs and rear springs of the upper and lower frame are of the same length, respectively, and that the rear ends of the front springs of the lower frame are in approximately horizontal alinement with the centers of the front springs of the upper frame, and that the forward ends of the rear springs of the lower frame are in approximately horizontal alinement with the centers of the rear springs of the upper frame. This arrangement facilitates the absorption of shocks and vibrations of the vehicle. By pivoting the outer ends of the springs 31 and 32, which support the upper frame, at points substantially vertically below the axles, and by arranging the pivoted centers of said springs at points lying substantially in vertical planes passing through the inner ends of the springs 15 and 20, which support the underslung frame 10, the shocks and vibrations encountered by the traveling vehicle are evenly distributed. The flexing of the springs supporting the lower frame are counteracted by the flexing of the intermediate springs which support the upper frame.

Various changes in the construction and arrangement of my vehicle frame may be made without departing from the spirit of my invention as covered by the appended claims.

I claim:

1. In combination, a front and a rear axle of a vehicle, a lower rectangular frame arranged below said axles, a pair of semi-elliptical front springs secured to said front axle, said springs supporting the forward end of said frame, a pair of semi-elliptical rear springs secured to said rear axle, said springs supporting the rear end of said frame, an upper frame of smaller dimensions than said lower frame arranged above said axles, a pair of semi-elliptical front springs, and a pair of semi-elliptical rear springs yieldingly connecting said lower frame to said upper frame at points intermediate the ends thereof, said frame connecting springs being pivoted at their inner ends and their centers to the upper side of said upper frame and pivoted at their outer ends to said lower frame at points lying in a vertical plane passing through the centers of the front and rear axle springs, respectively, the centers of said frame connecting springs being in longitudinal alinement with the outer ends of the adjacent axle springs.

2. In combination, a front and a rear axle of a vehicle, a lower frame arranged below said axles, a pair of front springs secured to said front axle from which the forward end of said frame is suspended, a pair of rear springs from which the rear end of said frame is suspended, an upper frame arranged above said axles, a pair of front springs, and a pair of rear springs yieldingly connecting said lower frame to said upper frame at points intermediate the ends thereof, said frame connecting springs being pivoted at their inner ends and their centers to said upper frame, and pivoted at their outer ends to said lower frame, the centers of said frame connecting springs being in longitudinal alinement with the outer ends of the adjacent axle springs.

3. In combination, a front and a rear axle of a vehicle, a lower frame arranged below said axles, a pair of front springs secured to said front axle from which the forward end of said frame is suspended, a pair of rear springs secured to said rear axle from which the rear end of said frame is suspended, an upper frame arranged above said lower frame, a pair of front springs, and a pair of rear springs yieldingly connecting said lower frame to said upper frame at points intermediate the ends thereof, said frame connecting springs being pivoted at their inner ends and their centers to said upper frame and pivoted at their outer ends to said lower frame at points lying in a vertical plane passing through the centers of the front and rear springs, respectively.

4. In combination, a front and a rear axle of a vehicle, a rigid underslung frame, a set of superposed semi-elliptical springs mounted on said axles, and whereon said frame is hung, a set of intermediate semi-elliptical springs supported by said frame, an upper frame wholly supported by said intermediate springs, the outer ends of said intermediate springs being pivoted to said lower frame, swinging pivots connecting the inner ends of said intermediate springs to said upper frame, and a rigid fulcrum for each of said intermediate springs pivotally connecting them with said upper frame at points intermediate their ends.

5. In combination, a front and a rear axle of a vehicle, a rigid underslung frame, a set of superposed springs tapering toward their opposite ends and mounted on said axles, said springs supporting said frame, a set of intermediate springs tapering toward their opposite ends and supported by said frame, an upper frame wholly supported by said intermediate springs, said upper frame being in substantially the same plane as said axles, the outer ends of said intermediate springs being pivoted to said lower frame, swinging pivots connecting the inner ends of said intermediate springs to said upper frame, and a rigid fulcrum for each of said intermediate springs pivotally connecting them with said upper frame at points intermediate their ends.

6. In combination, a front and a rear axle of a vehicle, a rigid underslung frame, a set of superposed springs mounted on said axles and whereon said frame is hung, a set of intermediate springs supported by said frame, an upper frame wholly supported by said intermediate springs, the outer ends of said intermediate springs being pivoted to said lower frame, movable pivots connecting the inner ends of said intermediate springs to said upper frame, and a rigid fulcrum for each of said intermediate springs pivotally connecting them with said upper frame at points intermediate their ends.

In testimony whereof I have signed my name to this specification.

FRED GUENTHER.